UNITED STATES PATENT OFFICE 2,394,967

ESTERS OF α-FORMYLPHENACETURIC ACID AND PROCESS OF PREPARING THE SAME

Samuel Kushner, Montvale, N. J., assignor to American Cyanamid Company, New York, N. Y., a corporation of Maine No Drawing. Application June 13, 1944, Serial No. 540,134

7 Claims. (Cl. 260—471)

This invention relates to new organic compounds and to methods of preparing the same. More particularly, the invention relates to esters of α-formylphenaceturic acid.

The new compounds of the present invention may be represented by the following general formula:

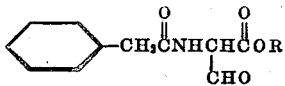

In this formula R represents an alkyl radical of from 1 to 18 carbon atoms.

The new compounds of the present invention are useful principally as intermediates in the preparation of other organic compounds, including some which have anti-bacterial properties. These compounds may be converted into serine, an amino acid, by reduction with aluminum amalgam and hydrolysis with an acid. They may be condensed with cysteine to yield α-(2-(4-carboxy) thiazolidinyl) phenaceturic esters, and with related compounds to yield similar reaction products. The new compounds are also useful in studying and elucidating the structure of other more complex organic substances. Other uses of these compounds will occur to those skilled in the art.

The compounds of the present invention are prepared by treating an ester of phenaceturic acid with an alkyl formate at low temperatures in the presence of alkali metal alkoxides or the like. Certain variations in the synthesis are permissible, and some of these are illustrated in the specific examples.

Compounds of the present invention are unusual in having a formyl group, —CHO, at the α-position, i. e., on the carbon atom adjacent to the carbonyl group of the phenaceturic acid portion of the molecule. The formyl group at this position is reactive and accounts in part for the utility of these compounds. This α-formyl group is comparatively unstable, and for this reason I prefer to carry out the synthesis at a moderately low temperature, for example, from about 0° C. to about 50° C. However, higher temperatures up to 100° C. may be employed if desired.

The invention will now be described in greater particularity by means of the following specific examples which describe the preparation of esters of phenaceturic acid and their conversion to corresponding esters of α-formyl phenaceturic acid. It will be understood that these examples are given for purposes of illustration and are not intended to limit the invention to the particular details described therein.

Example 1

25 g. of glycine was dissolved in 22 g. of 85% potassium hydroxide in 100 cc. of water. The stirred solution was cooled in a bath of Dry Ice and acetone, after which 43 cc. of phenacetyl chloride and 22 g. of 85% potassium hydroxide in 40 cc. of water were added simultaneously over a period of 45 minutes. After stirring for 10 minutes the clear solution was poured into iced, dilute hydrochloric acid. The precipitated solid, phenaceturic acid, was filtered and washed well with water.

5 g. of phenaceturic acid and 0.1 cc. of concentrated sulfuric acid were dissolved in 25 cc. of n-butanol and 75 cc. of benzene. The reaction mixture was refluxed in a Soxhlet extractor in an oil bath. The thimble was filled with anhydrous magnesium sulfate. At the end of 6 hours the excess benzene and butanol were removed under suction on a steam cone. The oil was taken up in ether, washed with water, dried over magnesium sulfate, and taken down to dryness on a steam cone. The product, when analyzed, checked perfectly with the theoretical analytical values of butylphenaceturate. The oil-like material crystallized when seeded with a sample of butylphenaceturate prepared by another method. The product had a melting point of about 35° C.

To a suspension of 0.68 g. of sodium as the ethoxide in 12.5 cc. of dry ether in an atmosphere of nitrogen was added 7.5 g. of butylphenaceturic acid in 12.5 cc. of ether. A reddish color ensued. 2.5 cc. of dry ethyl formate was added dropwise, with stirring, to the colored solution. A clear solution resulted. After standing in a cold room at 3° C. for 18 hours, the solution was allowed to stand at room temperature for 7 hours, after which it was again placed in the cold room for 17 hours. Ice and water were added to the solution, and it was extracted twice with ether. The filtrate was added to dilute, iced hydrochloric acid. It was then extracted twice with ether and saturated with ammonium sulfate and extracted twice more. The combined extracts were washed with water, dried over magnesium sulfate, and concentrated on a steam bath under suction. The product, butyl α-formylphenaceturate, was recovered as an oil-like material. Upon conversion to its 2,4-dinitrophenylhydrazone it had a melting point of 168–172° C. and was found to check closely with the theoretical analytical values for the hydrazone.

Example 2

To an ice-cold suspension of 0.68 g. of sodium as sodium ethoxide in 10 cc. of anhydrous ether was added dropwise, with swirling, 2.5 cc. of ethyl formate. The mixture was cooled some more and 6.33 g. of ethyl phenaceturate was added all at once. The flask was stoppered and well shaken. In the course of 20 minutes all of the phenaceturic ester had disappeared. After a short time a precipitate started to appear. At the end of 6 days at room temperature ice was added and the solution was well extracted with ether. The alkaline layer was acidified in iced, acetic acid, and the liberated oil was taken up in ether and washed well with water. After drying with magnesium sulfate, the ether was boiled off. The residual oil, ethyl α-formylphenaceturate, was converted into its hydrazone with 2,4-dinitrophenylhydrazine. This product had a melting point of 186–188° C. and analyzed correctly.

Example 3

Ethyl α-formylphenaceturate was prepared by a process similar to that of the preceding example with the exception that alcohol was used to replace the ether and approximately ten times the quantities of materials was used. After standing for 2 days 8.9 g. of an oil was obtained. The 2,4-dinitrophenylhydrazone melted at 184–186.5° C. and on analysis was found to check closely with the theoretical analytical values.

Example 4

1.16 g. of powdered potassium in 25 cc. of dry ether in an atmosphere of nitrogen was reacted with 6 cc. of absolute ethanol in three portions. The reaction flask was immersed in a Dry Ice-acetone bath and well stirred with a sealed stirrer. A solution of 6.6 g. of ethyl phenaceturate in 20 cc. of dry benzene along with 2.5 cc. of ethylformate was added over a period of 10 minutes to the well stirred solution. After stirring for 1 hour in the Dry Ice-acetone bath, the reaction vessel was removed and the contents stirred for an additional hour at room temperature. On standing overnight a heavy sludge appeared. Ice was added and the neutral portions were extracted with ether, followed by benzene. The alkaline layer was drizzled into iced hydrochloric acid saturated with ammonium sulfate and extracted three times with ether. When the ether solution was repeatedly extracted with a sodium bicarbonate solution, all of the hydrazone-forming material was removed. The bicarbonate washings were acidified with dilute hydrochloric acid, extracted thoroughly with ether and then washed with 100 cc. of 1% bicarbonate solution. The ether was dried over magnesium sulfate and then removed on a steam cone. The oily residue formed a 2,4-dinitrophenylhydrazone, as in the preceding examples, and was otherwise identified as ethyl α-formylphenaceturate.

In place of ether or alcohol, any other suitable inert solvent for the reactants may be used. Similarly, in place of ethyl formate, there may be used other reactive formates such as methyl formate, propyl formate, butyl formate, and the like.

The reaction time varies somewhat with the temperature, strength of formate, dilution, and other similar factors. Ordinarily, from 12 hours to about 7 days is required to bring about the reaction to a suitable stage of completion. It will be understood, however, that smaller yields of product are obtainable in a much shorter period of time, even after a few minutes' reaction.

I claim:

1. Alkyl esters of α-formylphenaceturic acid.
2. Ethyl α-formylphenaceturate.
3. Butyl α-formylphenaceturate.
4. A method of preparing alkyl esters of α-formylphenaceturic acid which comprises the step of subjecting an alkyl ester of phenaceturic acid to the action of an alkyl formate and a sodium alkoxide in an inert, anhydrous organic solvent.
5. A method of preparing alkyl esters of α-formylphenaceturic acid which comprises the step of subjecting an alkyl ester of phenaceturic acid to the action of an alkyl formate and an alkali metal alkoxide at a temperature not in excess of about 50° C.
6. A method of preparing ethyl α-formylphenaceturate which comprises subjecting ethyl phenaceturate to the action of ethyl formate and an alkali metal alkoxide at a temperature not in excess of about 50° C.
7. A method of preparing butyl α-formylphenaceturate which comprises subjecting butyl phenaceturate to the action of butyl formate and an alkali metal alkoxide at a temperature not in excess of about 50° C.

SAMUEL KUSHNER.